Nov. 8, 1927.  
C. A. KARLING ET AL  
1,648,275  
GRAPHIC BILLING DEVICE  
Filed Oct. 4, 1924
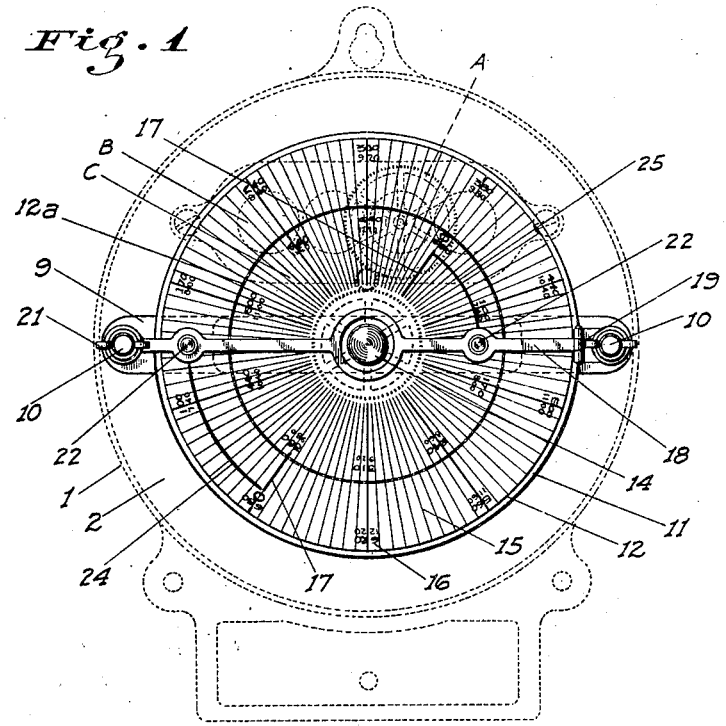
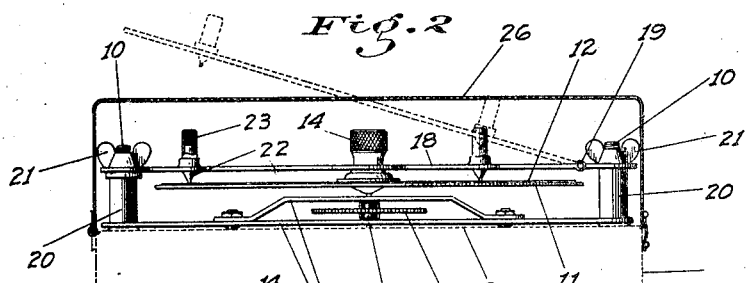
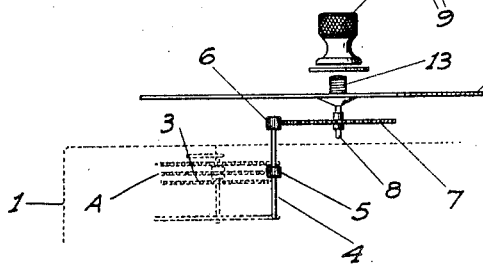
INVENTORS  
F. E. Howell and  
C. A. Karling  
BY  
ATTORNEY Patented Nov. 8, 1927.

1,648,275

UNITED STATES PATENT OFFICE.

CARL A. KARLING, OF PASO ROBLES, AND FRED E. HOWELL, OF SANTA MARIA, CALIFORNIA, ASSIGNORS TO RAY B. LYON, OF PASO ROBLES, CALIFORNIA.

GRAPHIC BILLING DEVICE.

Application filed October 4, 1924. Serial No. 741,734.

This invention relates to improvements in attachments for use in connection with standard gas or electric meters, our main object being to provide a chart, calibrated either in monetary units or in units of measurement, and means whereby with the operation of the meter when a flow of gas or electric current is passing therethrough a permanent and visible record either of the amount of such flow, or of its value expressed in dollars and cents or other monetary unit, will be made on the chart.

The chart is so calibrated and the record made thereon in such a manner that it can be readily understood and read by any person of average mentality.

By means of this device, the chart itself serves as the bill which may be presented to the consumer at the time the meter is read, when the chart is removed from the meter and a fresh one inserted.

This not only saves the operating company considerable expense now necessary in computing and sending out bills from the meter man's readings, but since the removal and insertion of the charts may be done in the presence of the consumer, he may satisfy himself that he is not being overcharged, and a frequent source of present complaint and dissatisfaction, sometimes unreasonable and unwarranted, but sometimes due to errors on the part of the meter man, will be eliminated.

A further object is to construct the chart, and the recording mechanism therefor, in such a manner that duplicate records will be made simultaneously, one of which may be handed to the consumer and the other retained by the company.

Still another object is to provide a device which may be readily installed on any standard meter with but little expense, and to provide means for enabling the chart itself to be easily and quickly placed in or removed from position on the device.

A further object of the invention is to produce a simple and inexpensive device and yet one which will be exceedingly effective for the purpose for which it is designed.

These objects we accomplish by means of such structure and relative arrangement of parts as will fully appear by a perusal of the following specification and claims.

In the drawings similar characters of reference indicate corresponding parts in the several views:

Figure 1 is a front outline of a standard electric meter, showing our recording attachment applied thereto.

Figure 2 is a side view of the attachment.

Figure 3 is a side view of the movable elements of the device, showing the connection of the same with the running gear of the meter.

Referring now more particularly to the characters of reference on the drawings, the numeral 1 denotes an ordinary electric meter casing, having an upper or front face 2 through which the indicating dials of the usual train of gears 3 is visible, and from which the consumption of current is at present computed.

Our attachment comprises a shaft 4 journaled in the meter in connection with the bearings of said train of gears, and positioned adjacent one of the gears of said train, in this case the gear A of the dial representing consumption in tens of the units of measurement.

Fixed on the shaft and meshing with the gear is a pinion 5. Another pinion 6 the same size as pinion 5 is on said shaft above the meter cover 2, this latter pinion meshing with a gear 7 which in this instance is the same size as the gear A. This gear 7 is mounted on a spindle 8 which is journaled in bearing or bracket means 9 extending centrally across the meter above the cover 2 and mounted in a fixed position by means of the usual opposed cover studs 10 of the meter. Fixed on the spindle 8 above the bearing means thereof is a flap plate 11 adapted to form a support for a circular chart 12, of thin cardboard or the like. This chart fits over a threaded stem 13 projecting above the plate in alinement with the spindle 8. A finger nut 14 is adapted to removably screw on to the stem, said screw then clamping the chart to the plate and preventing relative movement therebetween.

This chart is calibrated into a plurality of units of a predetermined nature, by means of radial lines 15 thereon. In the present case the lines are arranged as ten sections each having ten subdivisions, the arcuate length of each section being the distance moved by the plate and chart with each revolution of the gear A. These sections and subdivision lines may have indicia 16 printed adjacent thereto to denote either units of measurement or of monetary value. In the present instance the indicia represent the cost in dollars and cents of the current consumed, reading from a certain zero or starting line 17.

The chart is preferably divided into two concentric portions B and C by perforations 12ᴬ, the radial calibration lines 15 passing across both sections. The indicia numerals on the inner section C, while corresponding to those on the outer section B are arranged in the opposed order.

Extending diametrally of the chart and disposed thereabove is a cross bar 18, hinged adjacent one end as at 19, and mounted at its ends on the studs 10. Sleeves 20 are placed about the studs between said bar and the bracket 9 to prevent movement of said bar toward the plate, while said bar is removably clamped in position by the wing nuts 21 provided with said studs.

Pencils 22 or other suitable marking means are mounted in the bar 18 and are pressed into marking engagement with the chart by spring means 23. One of said pencils is positioned to make a line 24 on the outer chart portion B, while the other pencil is positioned to make a similar line 25 on the inner chart portion C.

The lines thus made with the rotation of the chart are of course of different lengths, since the pencils are different distances from the center of rotation. The arcuate travel however is the same. Also, since the pencils are here shown as disposed on opposite sides of said center of rotation, the lines 24 and 25 will run in opposite directions. For this reason the indicia numbers on the two chart sections are oppositely arranged as previously stated. If desired however, the pencils may both be disposed on the same side of the center of rotation in which case the markings made by the pencils would both run in the same direction, and the indicia numerals would be correspondingly arranged.

To prevent possible tampering with the device by unauthorized persons, a cover 26 would preferably be mounted over the device, removable only by the meter man or other employee.

In operation the wing nut 21 farthest from the hinge 19 is first removed and the bar 18 raised about its hinge. The nut 14 is then removed to enable the chart to be placed in position on the plate 11, so that the zero or starting line 17 will be directly under the pencils. The nut 14 is then screwed on the stem 13 to clamp the chart, and the bar 18 is lowered and clamped in position. To remove the chart, the same operations are carried out in reverse sequence. For instance, the chart shown herein shows a schedule for use in ordinary house lighting installations, where the current consumption will not usually run over 200 k. w. hours. Another chart would be calibrated with lighting installations consuming as much as 1600 k. w. hours. Other charts would be provided to take care of light and heating or cooking and other combinations which are given a special rate. The different power companies would of course have their own individual charts especially calibrated for them, since the schedule of charges of different companies differ.

The device could be adapted to use these other charts by driving the gearing of the device from the hundreds or other gear of the meter gear-train; or by altering the sizes of the gears of the device so that the chart travels at a slower speed than gear A.

From the foregoing description it will be readily seen that we have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described our invention what we claim as new and useful and desire to secure by Letters Patent is:

1. In a recording device having a record-carrying element and a marker-supporting element, movable relatively to each other an amount corresponding to the value to be recorded, a plurality of markers fixed to said second element, and a record sheet attached to said first element, formed with separable parts, each of which is positioned in the path of one of said markers and each adapted to receive an impression from its associated marker to indicate the said value.

2. In a recording device, a rotatable chart supporting element, means for removably clamping a chart onto said element, a marker to engage the chart, and supporting means for the marker arranged to enable the marker to be swung clear of the chart so as to permit the placement or removal of the chart with a movement lengthwise of the axis of the holder.

3. In a recording device, a chart supporting element, a marker supporting means including a bar to extend over and beyond the element on both sides thereof, supports for the ends of the bar, and hinge means in the bar between one end support and the adjacent side of the element.

In testimony whereof they affix their signatures.

CARL A. KARLING.
FRED E. HOWELL.